(No Model.) 5 Sheets—Sheet 2.

G. T. SMITH & W. F. COCHRANE.
ROLLER MILL.

No. 312,392. Patented Feb. 17, 1885.

WITNESSES
INVENTOR

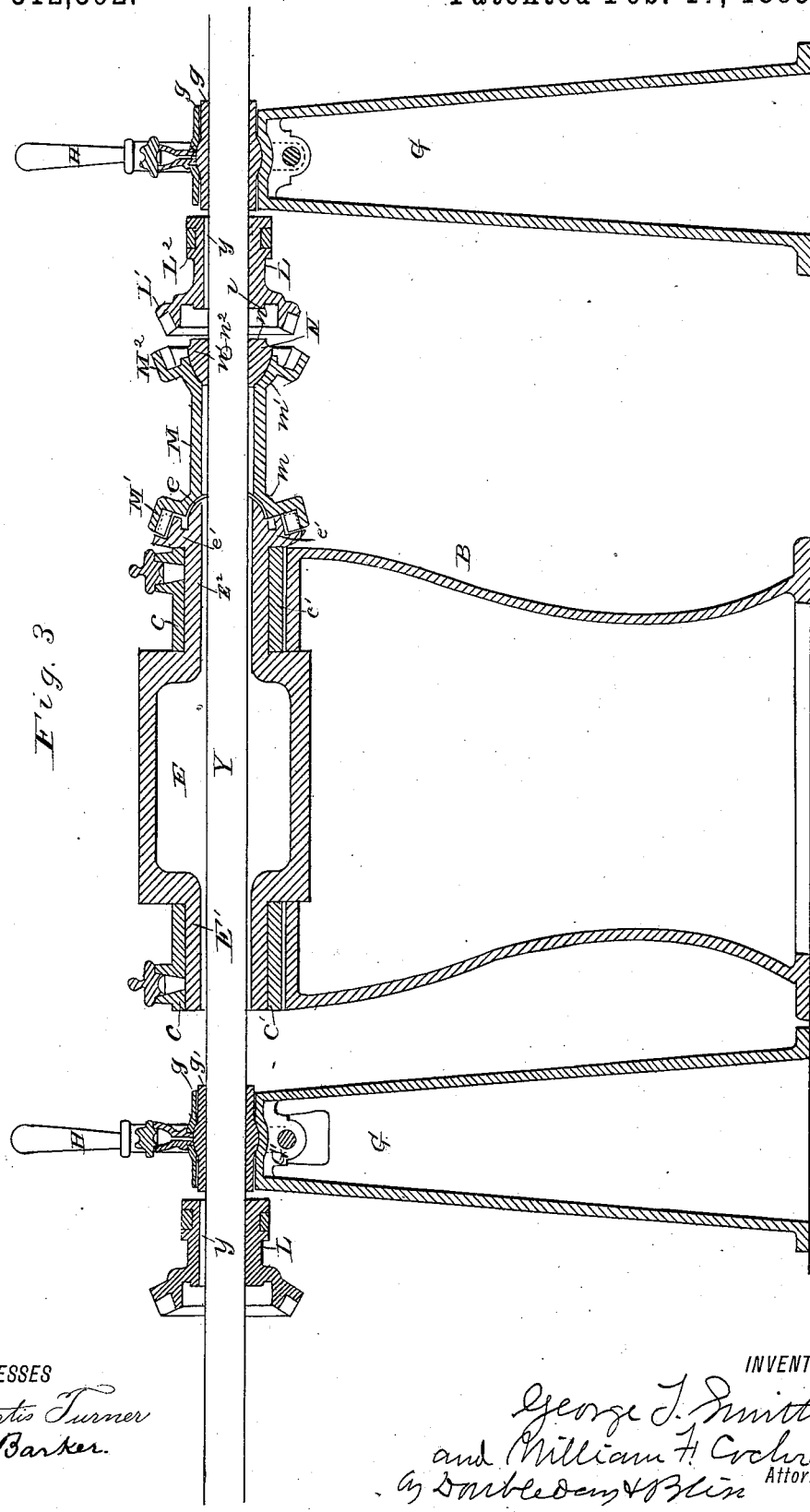

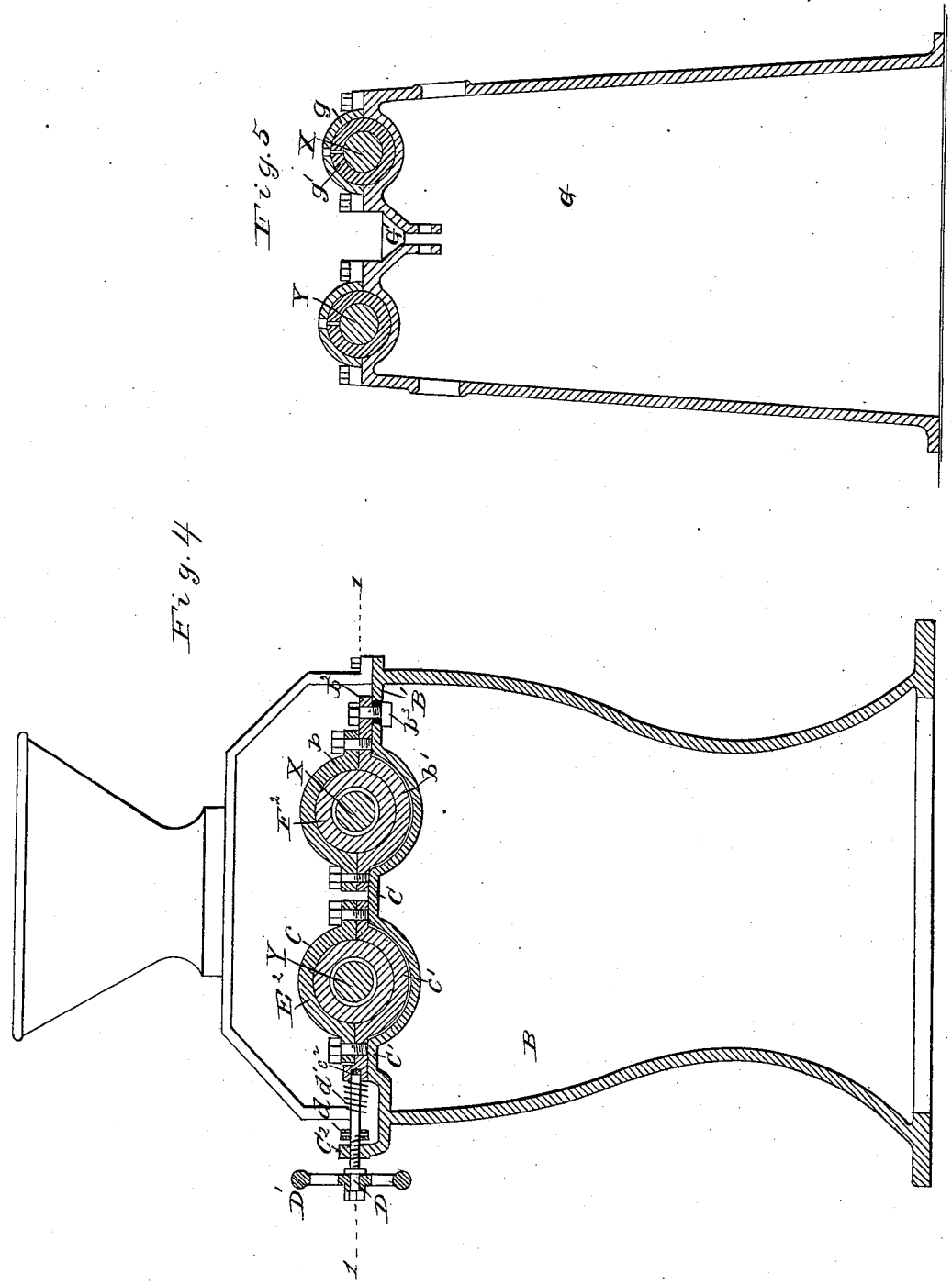

(No Model.) 5 Sheets—Sheet 5.
G. T. SMITH & W. F. COCHRANE.
ROLLER MILL.
No. 312,392. Patented Feb. 17, 1885.
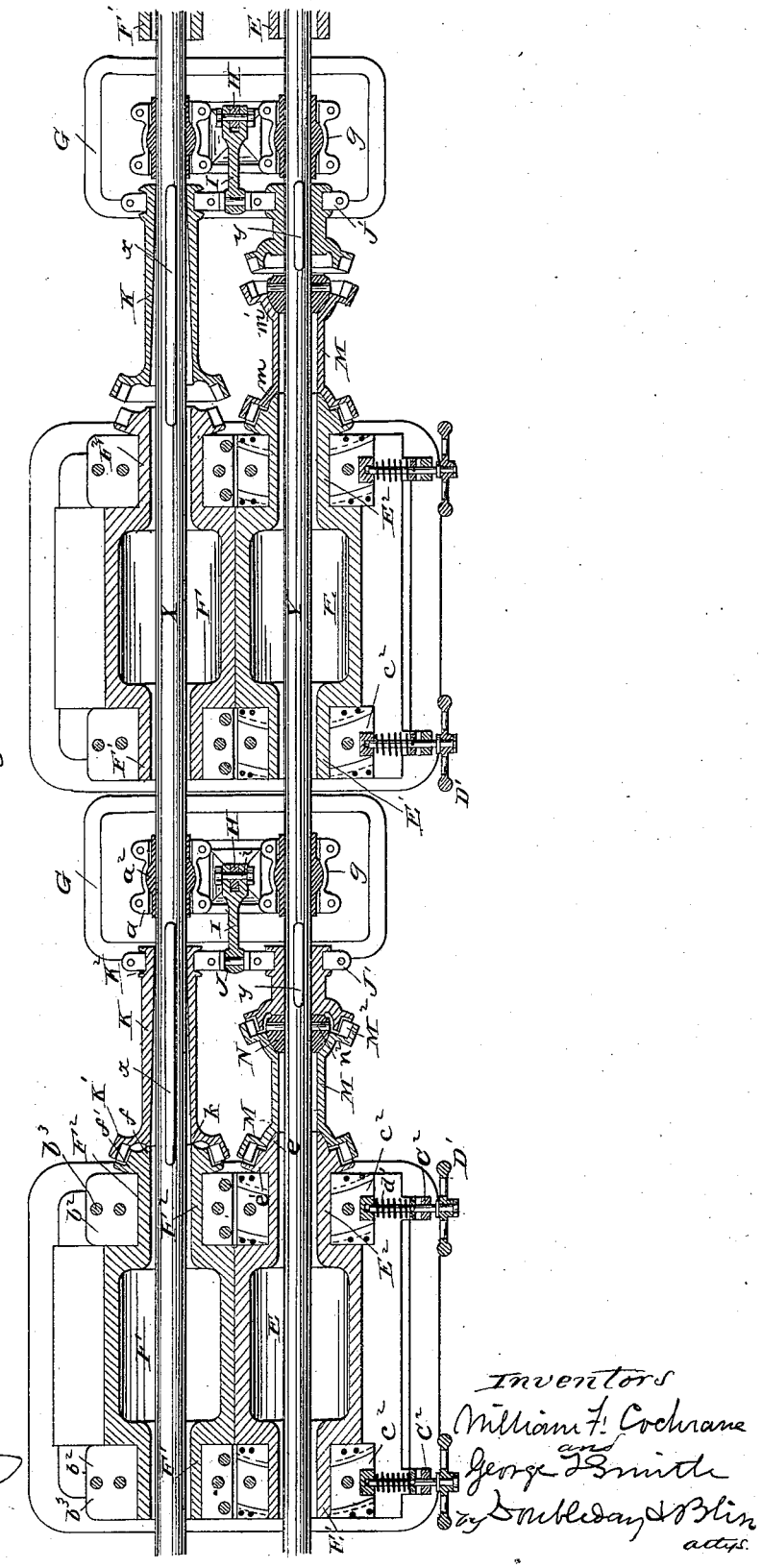

UNITED STATES PATENT OFFICE.

GEORGE T. SMITH AND WILLIAM F. COCHRANE, OF JACKSON, MICHIGAN.

ROLLER-MILL.

SPECIFICATION forming part of Letters Patent No. 312,392, dated February 17, 1885.

Application filed June 23, 1883. (No model.)

*To all whom it may concern:*

Be it known that we, GEORGE T. SMITH and WILLIAM F. COCHRANE, citizens of the United States, residing at Jackson, in the county of Jackson and State of Michigan, have invented certain new and useful Improvements in Roller-Mills, of which the following is a specification, reference being had therein to the accompanying drawings.

Figure 1:
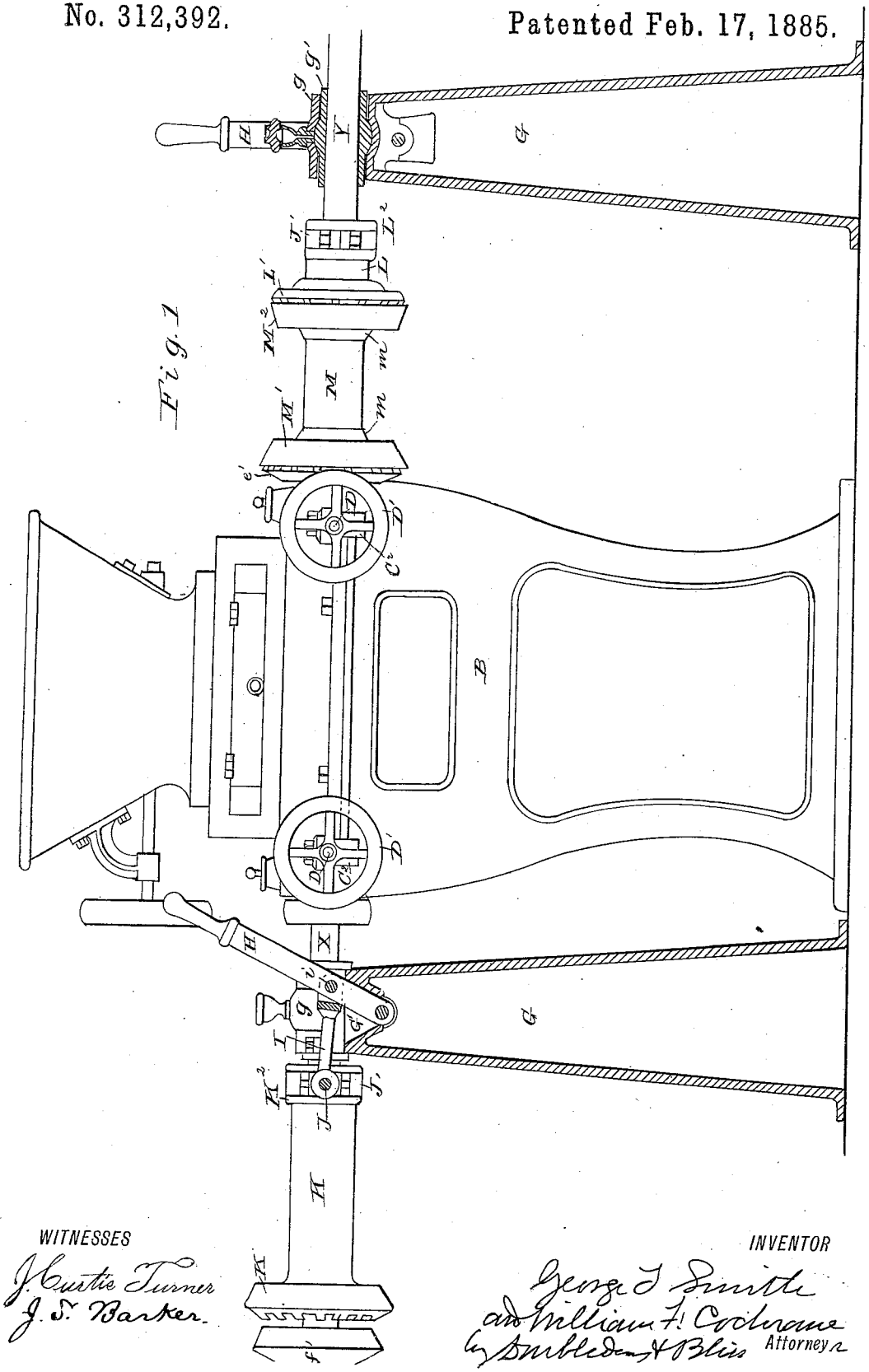
Figure 2:
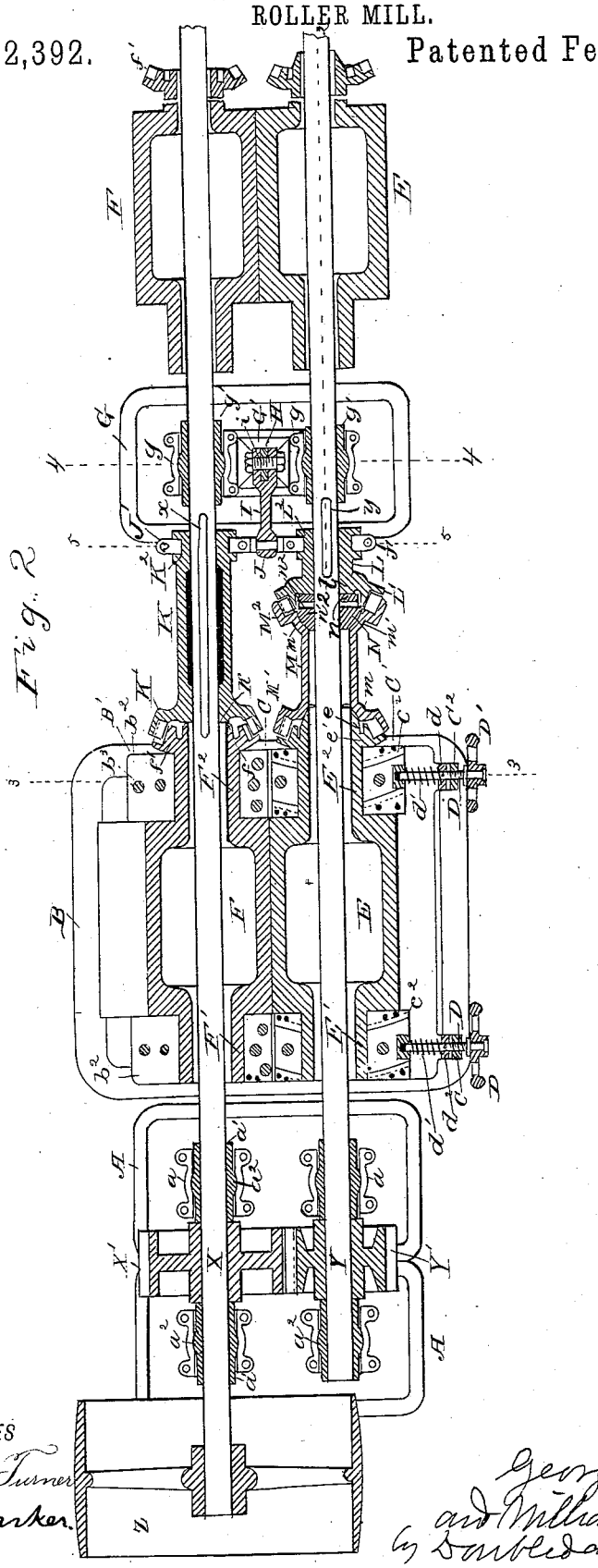
Figure 6:
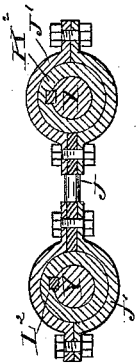

Figure 1 is an elevation, partly in section, of a machine containing our invention. Fig. 2 is a horizontal section taken on line 1 1 of Fig. 4. Fig. 3 is a vertical section of a portion of Fig. 1, taken on line 2 2, Fig. 2, which latter figure does not show the entire length of the machine represented in Figs. 1 and 3. Fig. 4 is a vertical transverse section of Fig. 1, taken on line 3 3, Fig. 2, from which latter figure the upper part of the machine has been removed. Fig. 5 is a vertical transverse section taken on line 4 4, Fig. 2. Fig. 6 is a vertical section on line 5 5, Fig. 2. Fig. 7 is a horizontal section taken centrally of the shafts, showing a modification of the coupling devices employed for connecting the rolls to their driving-shafts.

A A represent supporting frames or standards, which may be made in separate detached sections adapted to be bolted independently to the floor, or they may be cast in one piece, or made in sections and firmly connected to each other.

$a\ a$ represent boxings or bearings, which may be made of any usual or preferred construction, with an exception to be hereinafter noted, and bolted firmly to the upper portion of bed-plate of frame A.

$a'\ a'$ are tubular bearings each provided with a centrally-expanded portion, $a^2$, in globular form, these expanded portions being fitted into correspondingly-shaped cavities formed for their reception in the boxings $a\ a$. There are, by preference, four of these bearings, mounted upon the top of each pair of frames A A, or each double frame A A, to serve as bearings for one end of each of two shafts, X Y, which are geared together by means of spur-gears X' Y', keyed to the shafts X Y, respectively, the gear X' being, by preference, of greater diameter than the gear Y', so that the shaft Y shall be driven at a higher speed than that of the shaft X, which carries a pulley, Z, which may be belted to any desired motor. We prefer to use two of these bearings $a\ a'$ for each of the shafts, one bearing upon either side of the spur-gear, whereby longitudinal motion of the shafts is prevented.

B is another supporting frame or standard, provided at its upper end with a substantially rectangular plate or frame, the sides of which are constructed with horizontal portions B' C C', connected by intermediate depressed semicircular portions, as is plainly shown in Figs. 2 and 4, and at its front side with two upwardly-projecting ears or flanges, $C^2$, for a purpose to be described.

It is well known that in roller-mills it is desirable to have one of the rolls capable of adjustment, but, under ordinary circumstances, maintained firmly in position after a proper adjustment has been made, while the other roll of the pair is not only made adjustable, but has combined therewith mechanism by means of which it may be adjusted toward and from the first-named roll at the will of the operator. For this reason in describing this invention we propose to designate, for convenience, the first-named roll as the "stationary" roll, and the second-named roll as the "adjustable" roll.

Referring particularly to Fig. 4, $b\ b'$ are respectively the upper and lower members of an adjustable bearing, both members being bolted firmly together, the lower member being provided with a projecting flange or ear, $b^2$, and a bolt, $b^3$, by means of which the bearing may be adjustably connected with the portion B' of the frame, the portion B' of the frame through which the bolt $b^3$ passes being slotted, as shown in Fig. 4. There are two of these adjustable bearings upon the same side of the frame. On the opposite side of the frame there are also two bearings composed of two members, $c\ c'$, which are firmly bolted together, the lower member of each being provided with a socketed flange, $c^2$, which receives the inner end of an adjusting-screw, D, the threaded portion of which is seated in the upwardly-projecting flange $C^2$. There are two of these bearings $c\ c'\ c^2$ and adjusting-screws upon the front side of the frame, as is plainly shown in Figs. 1 and 2. Each screw is provided at its outer end with a hand-wheel, D'.

$d$ is a collar firmly secured to the screw-shaft D a short distance inside of the flange $C^2$.

$d'$ is a spiral spring surrounding this adjusting-screw shaft and pressing at one end on the collar $d$ and at its opposite end against the flange $c^2$ of the bearing.

E E' E² is a hollow roll surrounding shaft Y, its reduced portion or trunnion E' being supported in one of the adjustable bearings $c$ $c'$, the trunnion E² at its opposite end being supported in the other of these bearings.

F F' F² is a similar hollow roll surrounding the shaft X, having its trunnions F' F² supported in the adjustable bearings $b$ $b'$ $b^2$. The openings through these rolls are of much greater diameter than the shafts X Y, so that by means of the bearings which have been described the rolls may be moved laterally a short distance in order to properly adjust them without being brought in contact with their driving-shafts. It will also be understood that by means of the adjusting-screw shafts and the coiled springs $d'$ the adjustable roll E E' E² can be forced toward the stationary roll F F' F² with a yielding pressure, while at the same time the movable roll cannot be forced backward from the stationary roll, except to a limited extent, because its movement will be arrested by the engagement of the inner ends of the adjusting-screws with the bottom walls of the sockets in the flanges $c^2$, in which the inner ends of these screws are seated. (See Figs. 2 and 4.) Also, when desired, the tension of the coiled springs may be increased by screwing the collars $d$ toward the roller, in which case the inner ends of the screw-threaded shafts D will also serve as stops to limit the outward movement of the roll.

By an examination of Figs. 2 and 4 it will be understood that the roll E E' E² will be pressed into contact with roll F F' F² by the springs $d'$, the tension of which can be increased by advancing the screw-shafts D so as to regulate the crushing action of the rolls, while at the same time it (the movable roll) will yield slightly to permit the passage of substances which would otherwise operate injuriously by passing between the rolls, it being of course understood that it (the movable roll) can only move backward until the inner ends of the screw-shafts engage with the bottoms of the sockets in the flanges $c^2$. If, however, it be desired to force the movable roll toward the stationary one by the positive action of the screws, they may be advanced until their inner ends engage with the bottoms of the sockets in the flanges $c^2$.

We will now describe the mechanism which we have devised for communicating a rotary motion from the shafts X Y to the rolls. K K' K² is a sliding sleeve-coupler, the sleeve portion K fitting closely the shaft X, with which it is connected by means of a spline, $x$, so that while it is free to slide longitudinally on the shaft it rotates with it. One end of this coupler is expanded, as at K', into a flange provided with internal teeth or clutch-jaws adapted to interlock with correspondingly-shaped clutch-jaws formed upon the expanded portion $f'$ of the adjacent roll F. The inner face of the same end of the coupler at $k$ abuts against a corresponding shoulder, $f$, of the roll, these parts serving as stops to prevent the clutch faces or jaws from being unduly overlapped. The opposite end, K², of the coupler is grooved to receive a yoke-shifter, to be hereinafter described.

The devices for connecting the movable roll E E' E² with its driving-shaft Y are as follows:

M M' M² is one member of a coupler mounted loosely upon the shaft, the end M' being expanded into a flange with internal teeth or locking-jaws which take into corresponding teeth formed upon the expanded end $e'$ of the roll. The part $m$ is made in the form of a concave shell or socket which fits closely the rounded end $e$ $e$ of the roll, thus constituting a sort of ball or socket joint at this point. The opposite end, M², is also expanded into a flange which is provided with internal teeth or locking-jaws, and the part $m'$ is socket-shaped to engage with the adjacent circular portion $n'$ of a bearing, N, which is secured to the shaft by means of a pin, $n^2$, and rotates continuously with said shaft. The other member, L L' L², of the coupler fits closely the shaft Y, with which it is connected by means of a spline, $y$, so that while it is free to slide longitudinally upon the shaft it rotates with it. The part L of this member of the coupler is expanded into a flange, L', which is provided with external teeth or locking-jaws adapted to engage with the corresponding teeth of the flange M², and the internal shoulder, $l$, abuts against a corresponding shoulder, $n$, of the bearing N, Fig. 3.

G is a standard or frame provided with bearings $g$ $g'$ for the shafts X Y, and having in its upper face a recess, G', near the bottom of which is pivoted a shipping-lever, H.

I is a link pivoted at $i$ to lever H, and at its opposite end to the centrally-rounded portion J of the yoke, the circular loop ends J' J' of which are seated in the grooved ends K² L² of the couplers, respectively, so that by moving the lever into the proper position the clutch-faces of the parts $f'$ K' L' M² will engage with each other, thus connecting the rolls with the shafts X Y in such manner that a rotary motion will be imparted to said rolls. It will of course be understood that by means of the lever and this clutching mechanism the rolls can be connected with their respective shafts and disconnected therefrom at the will of the operator.

By an examination of Fig. 2 it will be understood that whenever the roll F F' F² is arranged eccentrically to the shaft X the part $f'$ will move in an eccentric path relative to the part K', and that hence there will be a little sliding motion of the teeth of the part $f'$ upon the teeth of the part K', and also of the shoulder $f$ upon the shoulder $k$, and that by reason of these shoulders abutting against each other relative movement of the teeth is facilitated; but under ordinary circumstances this roll can be so adjusted as to be concentric to its shaft X.

In order to provide for the movement of the roll E E' E² relative to its shaft, we have devised the construction of parts by which the shaft and roll are connected, and it will be understood that by reason of the ball-and-socket joints e m m' n' the frictional movement of parts, which is due to the roll being eccentric to its shaft, is greatly reduced.

Instead of making the couplers on shaft X to fit said shaft throughout their entire length, the opening through them may be made of greater diameter at the ends adjacent to the rolls which they drive, so that those ends may travel in a path which is eccentric to the shaft whenever the roll of that shaft is eccentric thereto, as will be understood by an examination of Fig. 7; but under ordinary circumstances, where it is desired to have one end of the coupler move in an eccentric path, we prefer to make it in two members, and construct them substantially like those which are used to connect the rolls to shaft Y.

In Fig. 7 the part K K' K² of the coupler is shown of greater internal diameter at one end than at the other, so that in case the roller F F' F² be adjusted toward or from the shaft to such position that it rotates eccentrically to the shaft the end K' of the coupler may also rotate in an eccentric path, it being of course understood that a little looseness between the part K² and the cross-head J is desirable in order to prevent undue strain upon these parts. In this figure we have also shown two pairs of rollers, the pair at the left of the figure being clutched or coupled to the shafts, so as to rotate therewith, while the pair near the right of the figure are disconnected from the shafts, and of course do not rotate therewith.

Although we have shown but two pairs of rolls mounted upon two parallel shafts, it is evident that their number might be increased to any desired extent, depending upon the length of the room in which they may be situated and other attending circumstances, and under some circumstances we propose to employ another pulley upon either or both of the shafts.

We do not wish to be limited to gearing the shafts to each other by means of cogged wheels, because they might be operated by belts, the two shafts being either belted to each other or driven from a common motor by separate belts or by a single belt, these various methods being well known for driving shafting in various classes of machinery.

We do not confine ourselves to any particular construction of crushing or reducing face for the rolls, nor to any particular construction of boxings or bearings for mounting either the shafts or the rolls.

We may apply our invention only to the rolls mounted upon one of the shafts, connecting the rolls upon the other shaft to their shaft by any ordinary construction by couplings, without departing from the spirit of our invention, which relates to mounting a number of pairs of hollow rolls upon two parallel shafts. So, also, the feeding-hoppers which we have shown may be of any ordinary or approved construction, and need not, therefore, be specifically described. These rolls may be arranged in such relation to another series on the floor below that material can be passed from one pair to another, as shall be required in the process of gradual reduction, or elevators may be used to receive the material, or a portion of it, after having passed through one pair of rolls, and deliver it to the next or some other pair driven by the same pair of shafts.

We do not in this case claim any invention except such as are specifically recited in the claims hereof, reserving the right to claim all other subject-matter in another application, No. 98,704, filed June 20, 1882.

What we claim is—

1. In a grinding-mill, the combination of a shaft, a grinding-roll around the shaft supported independently thereof and arranged, substantially as set forth, to have an open space between the shaft and the roll, and means, substantially as set forth, for detachably connecting the shaft and roll.

2. The combination of the grinding-roll having an axial aperture, a driving-shaft extending through and having a diameter less than the aperture in the roll, means for supporting the roll independently of the shaft, means for connecting the shaft with the roll, and an adjustable bearing for the support of the roll, substantially as set forth.

3. The combination of a shaft, a grinding-roll around the shaft, and having an aperture of a diameter larger than that of the shaft, a power wheel or motor connected with the shaft at one end of the roll, and means, substantially as described, for connecting the roll and the shaft detachably together, and situated at the other end of the roll, substantially as described.

4. The combination of a grinding-roll having a through longitudinal aperture, a shaft extending through said aperture and of smaller diameter, whereby a lateral or transverse movement of one of the aforesaid parts is permitted relative to the other, and a coupler connected with the shaft and rotated thereby, but free to slide, for effecting a disengagement of the shaft from the roll, substantially as set forth.

5. A hollow grinding-roll, in combination with a shaft extending through the roll, and a coupling surrounding the shaft and rotating therewith, but free to slide longitudinally thereon, and provided at one end with an opening of greater diameter than the shaft, whereby the coupling is at one end adapted to engage with the roll and move in a path eccentric to the axis of the shaft, substantially as set forth.

6. The combination of the grinding-roll having a longitudinal aperture, a shaft of shorter diameter than that of said aperture and situated therein, and a coupler made in two sections, one section being arranged to slide upon the shaft and adapted, substantially as set forth, at one end to engage with the roll and move in a path eccentric to the shaft, substantially as set forth.

7. The combination, with a shaft, of a series of hollow grinding-rolls mounted thereon, and couplers for connecting each of the rolls with the shaft, whereby one or more of the rolls may be disconnected from the shaft and remain at rest while the other rolls are connected with the shaft and rotate therewith, substantially as set forth.

8. The combination of a shaft, a grinding-roll surrounding the shaft, with a free space between the shaft and the roll, means for connecting the roll with the shaft, a second shaft parallel to that aforesaid, a roll surrounding the second shaft, and means, substantially as described, for adjusting the said second roll on a line at right angles to the axis of the shaft and independently thereof, as set forth.

9. The combination of the shaft, a grinding-roll surrounding the shaft and having an aperture of greater diameter than the latter, whereby the roll is adapted to be rotated eccentrically to the shaft, and a coupler, one portion of which rotates concentrically with the shaft, and another portion of which rotates around the shaft eccentrically, whereby it is adapted to be connected to the roll to impart power thereto, substantially as set forth.

In testimony whereof we affix our signatures in presence of two witnesses.

GEORGE T. SMITH.
WILLIAM F. COCHRANE.

Witnesses:
C. F. KNAPP,
GEO. S. BENNETT.